Feb. 18, 1958 N. C. FULMER 2,824,224

TELEVISION SYNCHRONIZING CIRCUIT

Filed April 14, 1954

INVENTOR
NORMAN C. FULMER

BY Darby & Darby

ATTORNEYS

United States Patent Office 2,824,224

Patented Feb. 18, 1958

2,824,224

TELEVISION SYNCHRONIZING CIRCUIT

Norman C. Fulmer, Pearl River, N. Y., assignor to Allen B. Du Mont Laboratories, Inc., Clifton, N. J., a corporation of Delaware Application April 14, 1954, Serial No. 423,092

6 Claims. (Cl. 250—27)

Figure 1:
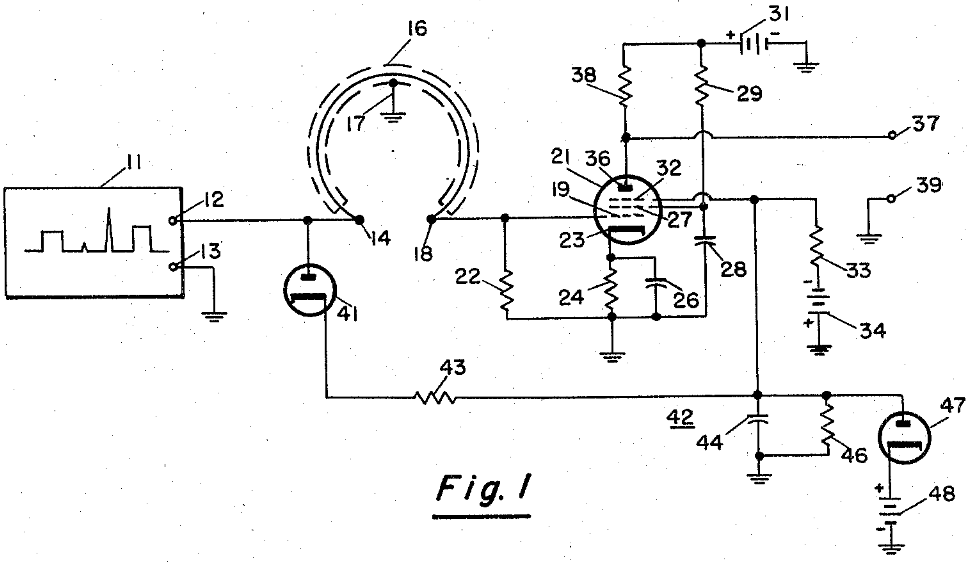

This invention relates to television synchronizing circuits, and particularly to a circuit for eliminating noise in television synchronizing signals.

The conventional prior art noise-reducing synchronizing circuits employ a clipping action. In some systems, the noise signals are clipped off and removed at a level slightly above the maximum level of the desired signals. In such a system, it is impossible to reduce the noise below the maximum level of the desired signal. Other prior art circuits have employed a method of clipping the noise signals at a level slightly above the maximum level of desired signals, and inverting and recombining the clipped noise pulse with the remaining portion of the noise pulse, thereby "punching a hole" in the noise pulse. However, such a system is not effective on noise pulses which do not exceed the magnitude of the desired signal, since these noise pulses cannot be clipped.

It is an object of the present invention to provide an improved noise-eliminating television synchronizing circuit which does not depend on clipping the noise signals, and which eliminates substantially all noise signals regardless of the magnitudes thereof. Other objects will be apparent.

Figure 2:
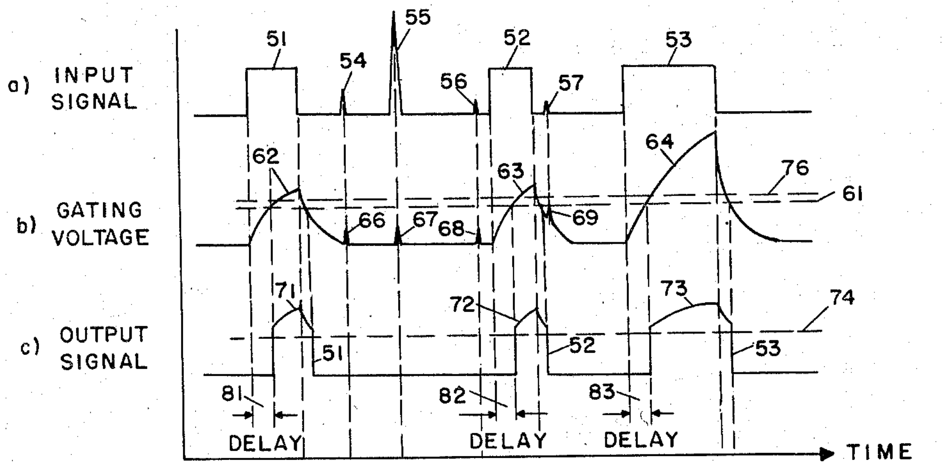
Figure 3:
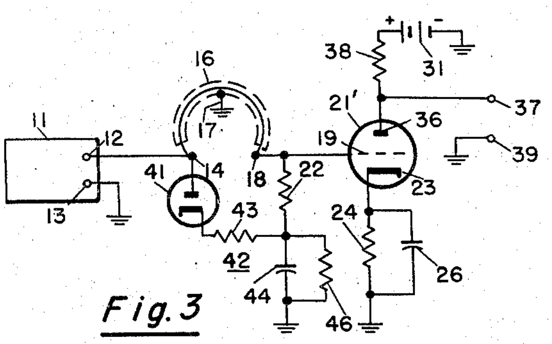

In the drawing,

Fig. 1 is a schematic electrical diagram of a preferred embodiment of the invention, Fig. 2 is a graphical representation of the electrical signals utilized in the invention, and Fig. 3 is an electrical schematic diagram of an alternative embodiment of the invention.

Referring to Fig. 1, there is provided a source 11 of synchronizing signals or other electrical pulses which are subject to having undesired noise signals included therewith. The signal source 11 may comprise, for example, a television antenna system, R. F. amplifiers, mixers, intermediate-frequency amplifiers, and a synchronizing signal detector, in which case the output terminals 12, 13 will be from the synchronizing signal detector. The terminal 13 is connected to electrical ground. The terminal 12 is connected to an input terminal 14 of a delay line 16, which may comprise a length of coaxial cable having an outer shield which is grounded, as indicated at 17. The output terminal 18 of the delay line 16 is connected to a control grid 19 of an electronic tube 21. A resistor 22 is connected between the grid 19 and electrical ground. A cathode 23 is connected to electrical ground through a parallel-connected bias resistor 24 and condenser 26.

A screen grid 27 is by-passed to ground through a condenser 28, and is connected through a resistor 29 to a terminal of a voltage source 31, the remaining terminal of the voltage source 31 being connected to electrical ground. A second control grid or gating control grid or gating control element 32 is connected through a resistor 33 to a source 34 of bias voltage. An output anode 36 is connected to an output terminal 37, and also is connected through a load resistance 38 to the voltage source 31. A second output terminal 39 is connected to electrical ground.

A diode or rectifier 41 is connected between the terminals 12, 14 and an integrating circuit 42. The integrating circuit 42 comprises a resistor 43 connected in series with respect to the diode 41, and a condenser 44 and a resistor 46 connected between the gating electrode 32 and electrical ground. A diode 47 and source 48 of bias voltage are connected in series between the gating electrode 32 and electrical ground.

The embodiment of Fig. 1 functions as follows. The input signal from the signal source 11, shown in Fig. 2*a*, may comprise, for example, television synchronizing signals 51, 52 for synchronizing horizontal sweep circuits in a television receiver, and a synchronizing pulse 53 of relatively longer duration than the pulses 51, 52, for synchronizing the vertical sweep circuits in a television receiver. The input signal also comprises, usually sporadically, undesired noise pulses 54—57. These noise pulses are usually in the form of relatively short duration and sometimes high-amplitude signals.

The tube 21 functions as a gated amplifier tube. The signals from the source 11 are connected through the hold-off diode 41 to the integrating circuit 42, where the signals tend to build up a charge on the integrating condenser 44, thus forming an integrating signal which is connected to the gating electrode 32. This gating signal is shown in Fig. 2*b*. In Fig. 2*b* the dotted line 61 indicates the threshold control level or gating level of the gating electrode 32. That is, when the gating signal is below the control level 61, the tube 21 will be in its "off" condition and will not amplify signals fed to the control grid 19. However, when the gating voltage reaches or exceeds the threshold level 61, the tube 21 will be in its "on" condition, and will amplify the signals which are fed to the control electrode 19, and the amplified signals will appear at the output terminals 37, 39.

As will be seen in Fig. 2*b*, the desired synchronizing signals 51, 52, 53 will cause the integrating condenser 44 to charge as shown by the integrating pulses 62, 63 and 64. The integrated synchronizing pulses 62, 63, 64 extend above the gating level 61; hence, the tube 21 will be activated momentarily during or shortly after the occurrence of each of the desired synchronizing pulses 51, 52, 53. The noise pulses 54—57, on the other hand, when integrated, charge the condenser 44 only a slight amount, as indicated at 66—69. The noise pulses contain insufficient energy to charge the integrating condenser 44 to a high enough voltage to actuate the gating electrode 32. Hence, the tube 21 will not be gated into its "on" condition when noise pulses occur.

The rate of charge of the integrating condenser 44 is determined primarily by the resistor 43. The rate of discharge of condenser 44 is determined primarily by the resistor 46. Preferably, the resistor 46 has a small enough value to provide a relatively short time-constant for discharging the condenser 44, so that a noise pulse 57 which occurs immediately after a synchronizing pulse 52, when integrated as shown at 69, will be far enough down on the discharge slope of the integrated pulse 63 so as not to actuate the gating electrode 32.

The output signal is shown in Fig. 2*c*. Only the desired synchronizing pulses 51, 52, 53 appear at the output terminals 37, 39. The output pulses have superimposed thereon a portion of the gating signal, as shown at 71, 72 and 73, which may be removed by clipping the output signal at the level 74.

For the conditions and operation described above, the diode 47 and bias voltage source 48 are not employed in the circuit. If desired, the diode 47 and voltage source 48 may be connected as shown in Fig. 1 to clip the gating voltage signal at the level 76 shown in Fig. 2*b*, thus providing a flat-topped gating signal to the gating electrode 32 and eliminating the peaked tops 71, 72, 73 on the output signal, and eliminating the need for clipping the output signal at the level 74. Under certain conditions the gating signal can be clipped at the level 76 by saturation of the gating electrode 32.

As indicated by the numbers 81, 82, and 83 in Fig. 2*c*, the input signal from the voltage source 11 is delayed by the delay line 16 before reaching the control grid 19. This delay permits the gating voltage charge to build up on the integrating condenser 44 to the gating level, and actuate the tube 21 into its "on" condition, before the desired signals reach the control grid 19. The signal delay thus permits the entire desired pulses to be amplified by the tube 21. However, the delay line 16 may be eliminated if desired, in which case a portion of the beginning of each synchronizing pulse will become removed, due to the fact that the leading portions of the pulses will appear at the control grid 19 before the gating electrode 32 has been actuated. Under certain conditions, however, this loss of the leading portions of the pulses will be tolerable. If the charging time-constant of the integrating circuit 42 is made small, then only a small part of the leading edges of the pulses will be eliminated.

In the alternative embodiment shown in Fig. 3, a triode amplifier tube 21' is employed. The control grid 19 of this tube is used for gating as well as for the input signal connection. When a desired voltage pulse having a sufficient amplitude and time duration occurs, the integrating condenser 44 charges to a sufficient level so as to bias the control grid 19 so that the input signal can be suitably amplified by the tube 21'. Relatively short signals, however, such as noise pulses, will not charge up the condenser 44 to a sufficient level for these undesired short pulses to be amplified by the tube 21'. Accordingly, only the desired signals will appear at the output terminals 37, 39.

While a preferred embodiment of the invention has been shown and described, various modifications thereof will appear to those skilled in the art. The scope of the invention is defined in the following claims.

What is claimed is:

1. An electrical circuit comprising an electronic tube having a signal-input grid, a gating grid, and an output electrode, a source of pulse signals of a given polarity connected electrically to said signal-input grid, said pulse signals being subject to having undesired noise signals included therewith, and an integrating circuit connected between said source and said gating grid for integrating said input signal and applying said integrating signal to said gating grid in said given polarity.

2. The circuit in accordance with claim 1, including a delay line connected in series between said signal source and said signal-input grid.

3. The circuit in accordance with claim 2, including a diode connected between said signal source and said integrating circuit.

4. The circuit in accordance with claim 3, in which said integrating circuit comprises an energy-storing condenser, and including a biased diode connected across said condenser.

5. An electrical circuit comprising an electronic tube having a cathode, a pair of control grids, and an anode, a two-terminal source of pulse signals of a given polarity, an electrical connection between one of said terminals and one of said control grids, said pulse signals being subject to having undesired noise signals included therewith, a diode and a first resistor connected in series between said one terminal and the remaining said control grid, and a second resistor and a condenser connected in parallel between said remaining control grid and the remaining said terminal whereby said pulse is integrated by both said resistors and said condenser and said integrated signal applied to said remaining control grid in said given polarity.

6. The circuit in accordance with claim 5, including a delay line connected in series between said one terminal and said one control grid.

References Cited in the file of this patent

UNITED STATES PATENTS

| | | |
|---|---|---|
| 2,211,942 | White | Aug. 20, 1940 |
| 2,539,374 | Pourciau et al. | Jan. 23, 1951 |
| 2,609,501 | Guthrie | Sept. 2, 1952 |
| 2,648,766 | Eberhard | Aug. 11, 1953 |
| 2,651,753 | Buyer | Sept. 8, 1953 |
| 2,681,989 | Cunniff | June 22, 1954 |